United States Patent [19]
Ho et al.

[11] Patent Number: 6,148,024
[45] Date of Patent: Nov. 14, 2000

[54] FFT-BASED MULTITONE DPSK MODEM

[75] Inventors: Jin-Meng Ho, Lake Hiawatha; Gopal K. Jaisingh, Montville, both of N.J.

[73] Assignee: AT&T Corporation, New York, N.Y.

[21] Appl. No.: 08/810,577

[22] Filed: Mar. 4, 1997

[51] Int. Cl.[7] .................................................. H04B 1/38
[52] U.S. Cl. ........................ 375/222; 375/283; 370/210
[58] Field of Search ................................ 341/111, 302; 370/404, 479, 208, 210; 375/219, 222, 283, 350, 362, 366, 229, 231, 232, 279, 308, 329; 455/42, 102

[56] References Cited

U.S. PATENT DOCUMENTS

| | | | |
|---|---|---|---|
| 4,179,586 | 12/1979 | Mathews, Jr. et al. | 380/33 |
| 4,679,227 | 7/1987 | Hughes-Hartogs | 379/98 |
| 4,833,706 | 5/1989 | Hughes-Hartogs | 379/98 |
| 5,008,670 | 4/1991 | Zimmer | 341/113 |
| 5,023,889 | 6/1991 | Divsalar et al. | 375/244 |
| 5,228,062 | 7/1993 | Bingham | 375/344 |
| 5,285,474 | 2/1994 | Chow et al. | 375/231 |
| 5,313,493 | 5/1994 | Dutta | 375/283 |
| 5,416,801 | 5/1995 | Chouly et al. | 325/260 |
| 5,838,799 | 11/1998 | Cioffi et al. | 381/2 |

FOREIGN PATENT DOCUMENTS

| | | |
|---|---|---|
| 0 430 587 A2 | 6/1991 | European Pat. Off. . |
| 0 719 004 A2 | 6/1996 | European Pat. Off. . |
| 0 722 235 A2 | 7/1996 | European Pat. Off. . |
| WO 96/31960 | 10/1996 | WIPO . |

OTHER PUBLICATIONS

M. Saito et al., "Transmission Characteristics of DQPSK–OFDM for Terrestrial Digital Broadcasting Systems," IEICE Transactions on Communications, JP, Institute of Electronics Information and Comm. Eng. Tokyo., vol. E77–B, No. 12, pp. 1451–1460, Dec. 1994.

V. Engels, et al., "OFDM–Ubertragungsverfahren Fur Den Digitalen Fernsehrundfunk," RTM Rundfunktechnische Mitteilungen, vol. 37 No. 6, Nov./Dec. 1993.

Bingham, J. A. C., "Multicarrier Modulation for Data Transmission: An Idea Whose Time Has Come", IEEE Com. Mag. vol. 28 Issue: 5 pp. 5–14, May 1990.

Wilson, S.K. et al, "Erasure tagging in a slow Rayleigh–fading environment", Global Telecom. Conf. GLOBECOM '94 vol. 2 pp. 984–988, Dec. 1994.

Proakis, J. G., "Digital Communications" 3rd edition, by McGraw–Hill Inc., New York, Chap. 12 pp. 680–693, 1995.

Caswell, A. C., "Multicarrier transmission in a mobile radio channel", IEEE Electronic Letter vol. 32 Issue: 21 pp. 1962–1963, Oct. 1996.

*Primary Examiner*—Stephen Chin
*Assistant Examiner*—Chieh M. Fan
*Attorney, Agent, or Firm*—Banner & Witcoff, Ltd.

[57] ABSTRACT

A system and a method for transmitting coded information bits using multitone techniques on a frame-by-frame basis. For transmission, coded information bits are mapped into differential phase signals and absolute phase signals are generated based on differential phase signals. N complex symbols are then generated and inverse discrete Fourier transformed into N complex, time-domain samples, which are augmented with a cyclic prefix and suffix. The augmented N complex, time-domain samples are then separated into two real samples and converted into first and second baseband signals. The first and second baseband signals are impressed into quadrature carrier components to form in-phase and quadrature signal components which are combined into an RF signal prior to transmission. For reception, a received RF signal is non-coherently quadrature demodulated into first and second quadrature baseband signals. First and second quadrature sample sequences are generated by sampling the quadrature baseband signals in parallel. The added cyclic prefix and suffix are discarded, and N complex numbers are generated from the first and second quadrature (real) sample sequences. N channel-weighted tones are generated by performing a discrete Fourier transform on the N complex numbers. N phase difference signals are generated which are demapped into coded information bits according to a predetermined phase constellation.

36 Claims, 2 Drawing Sheets

FFT-BASED MULTITONE DPSK MODEM

CROSS-REFERENCE TO RELATED APPLICATIONS

The present application is related to U.S. patent application Ser. No. 08/808,782 entitled "Method For Multitone Division Multiple Access Communications", filed Mar. 4, 1997; U.S. patent application Ser. No. 08/808,776 entitled "Differential PSK Signalling In CDMA Networks", filed Mar. 4, 1997; U.S. patent application Ser. No. 08/808,777 entitled "Method and System Providing Unified DPSK-PSK Signalling For CDMA-Based Satellite Communications", filed Mar. 4, 1997, each commonly assigned, and each of which are incorporated by reference herein.

BACKGROUND OF THE INVENTION

1. Field of the Invention

The present invention relates to the field of telecommunications. More particularly, the present invention relates to a system and a method for digital modulation and demodulation using FFT-based multitone concepts.

2. Description of the Related Art

Intersymbol interference distorts the signal content of a transmitted signal, possibly resulting in severe information transmission errors. Intersymbol interference arises from channel distortion, multipath spread, and/or sampling offset, and places significant design constraints on transmitting and receiving filters. The effects of intersymbol interference increase with increasing transmission speed and, consequently, cause a major impediment for broadband high-speed transmission, especially for wireless multimedia in which multipath signal components are frequently produced.

Multipath components are combined in a Code Division Multiple Access (CDMA) rake receiver used for wireless communications, but frequently the spread of the multipath components is comparable to, or larger than, the symbol interval, thus giving rise to substantial intersymbol interference. Another conventional approach for minimizing intersymbol interference is by using sophisticated channel equalization techniques.

What is needed is a way to avoid intersymbol interference without using channel equalization in high-speed broadband networks.

SUMMARY OF THE INVENTION

The present invention provides a system and a method providing intersymbol interference free communication without using a channel equalizer. In so doing, the present invention relaxes design constraints with respect to transmitting and receiving filters, as well as with respect to receiver timing accuracy. The present invention effectively separates overlapped symbols caused by channel distortion occurring, for example, in wired media, and caused by multipath spread occurring, for example, in wireless environments. Coded information is carried by a plurality of tones thus alleviating frequency selective fading. The present invention eliminates baseband filter introduced intersymbol interference and provides desirable signal characteristics, such as a small out-of-band spillover and a fast tail decay. Transmitting and receiving filter design constraints are eased because the respective filter impulse responses can span several symbols in numerous forms. Receiver timing sensitivity is also greatly reduced. Carrier phase estimation and/or channel response estimation is not necessary because the present invention uses differential phase detection. And since multitone modulation and demodulation is realized through a fast Fourier transform, hardware implementation is relatively simple. The invention is especially useful for packetized broadband high-speed transmission, which most notably experiences the detrimental effects noted above.

The advantages of the present invention are provided by a system and a method for transmitting coded information bits using multitone techniques. According to the invention, coded information bits are transmitted on a frame-by-frame basis. Each frame of the coded information bits is mapped into N differential phases by parsing the frame into N groups of bits, with each group of bits having a predetermined number of coded information bits. An absolute phase set is generated for each frame based on the differential phase set for the current frame and the absolute phase set for the preceding frame. A serial stream of N complex symbols is generated for each frame based on the sequence of N absolute phases for the frame. N complex, time-domain samples are further generated for each frame by applying an inverse discrete Fourier transform to the N complex symbols for the frame. The N complex, time-domain samples in each frame are augmented with a cyclic prefix and a cyclic suffix. Preferably, the cyclic prefix has a length that is equal to the length of the cyclic suffix plus the dispersion of the digital channel connected to the multitone modem. The cyclic suffix can be either one or two samples in length. The augmented complex samples are then separated into first and second data sequences for each frame. The first data sequence is a sequence of real samples that are the real part of the complex samples in each frame. The second data sequence is a sequence of real samples that are the imaginary part of the complex samples in each frame. The first and second data sequences are converted into first and second baseband signals, respectively, by a pair of identical D/A converters. In-phase and quadrature signals are formed by performing quadrature modulation with the first and second baseband signals, respectively. The in-phase and quadrature signals are then combined into an RF signal prior to transmission.

To receive coded information bits, a received RF signal is non-coherently quadrature demodulated into first and second quadrature baseband signals. First and second quadrature sample sequences are generated by sampling the first and second quadrature baseband signals in parallel. Any prefix and suffix included with the first and second quadrature sample sequences in each frame are removed and N complex numbers are generated for each frame by pairing remaining corresponding samples of the first and second quadrature sample sequences. N channel-weighted tones are generated for each frame by performing a discrete Fourier transform on the N complex samples in the frame. A stream of N phase difference signals is generated for each frame based on a comparison of the N channel-weighted tones for the frame and a frame preceding the frame. The stream of phase difference signals is then demapped into coded information bits according to a predetermined phase constellation.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a modulation-demodulation (modem) system and method that overcomes intersymbol interference caused by channel distortion and/or multipath spread, or that is intentionally introduced through the transmitting and receiving filter designs for achieving other desired signal characteristics. The present invention does not use channel equalization, as is required for conventional modem techniques for preventing severe performance degradation. Moreover, the present invention uses non-coherent quadrature carrier demodulation and converts signals between carrier and baseband frequencies without requiring an estimate of the carrier phase.

The FFT-based multitone DPSK modem of the present invention transmits coded information sequences frame by frame. Each frame is divided into N groups of bits that are first differentially phase encoded and then transformed into N complex symbols on a complex signal plane. The N symbols are carried over the channel by N discrete tones, as realized by an inverse discrete Fourier transform (IDFT) performed on the N symbols producing N complex (temporal) samples. Cyclic prefix samples are added to the N temporal samples for allowing for time dispersion of the overall communication channel, including any time dispersion introduced by the transmitting filter, the receiving filter, and the transport medium, while at the same time achieving intersymbol interference free signal characteristics. The prefix and suffix samples also permit mistiming in frame synchronization and sampling at a receiver. The complex samples are separated into real and imaginary parts, and then impressed into quadrature carrier components prior to RF transmission.

A reverse procedure is applied to the received signal. That is, the received signal is down-converted to a baseband signal using non-coherent quadrature demodulation, and then the extended frames are reprocessed using quadrature baseband sampling. The reprocessing removes the cyclic prefix and suffix samples, and the remaining quadrature samples are recombined into N complex numbers. The N multitones, which have been distorted by phase non-coherence, channel response and noise, are recovered using a discrete Fourier transform (DFT). Distortion is essentially eliminated by comparing the differential phases of the corresponding tones between two consecutive frames. The transmitted coded information is decoded using the extracted differential phase information. Preferably, both the DFT and IDFT are implemented by an N-point fast Fourier transform (FFT) algorithm.

Figure 1:
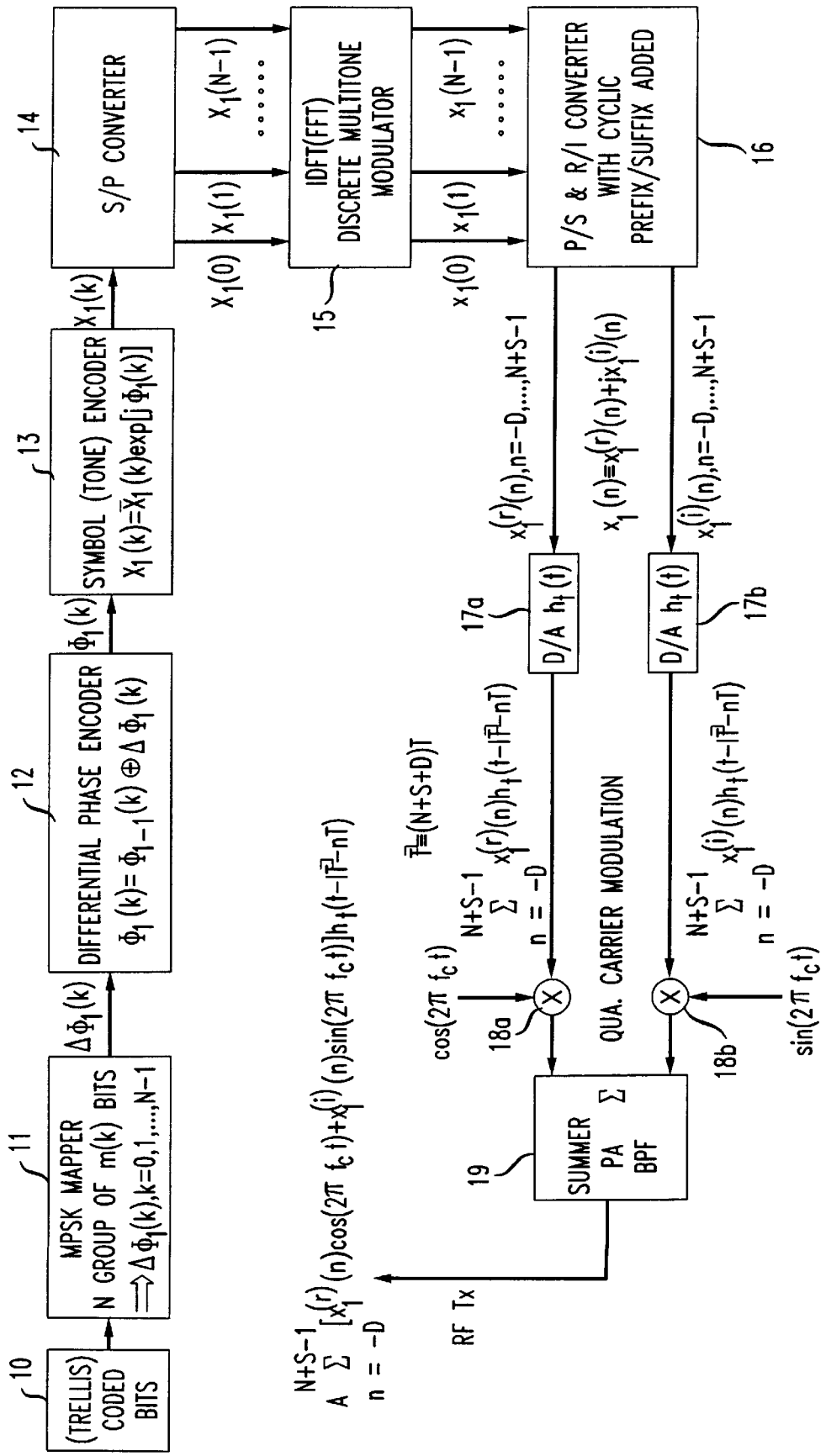
FIG. 1 shows a block diagram of the basic functional elements of an FFT-based multitone DPSK modem configured as a transmitter according to the present invention.

FIG. 1 shows a block diagram of the basic functional elements of an FFT-based multitone DPSK modem according to the invention that is configured as a transmitter for a single bit stream. In FIG. 1, a sequence of (trellis) coded information bits 10 are input to an MPSK mapper 11. MPSK mapper 11 maps groups of data bits onto MPSK (phase shift keying) constellation points. In particular, the coded information bits are segmented into frames of M bits. (In this case, the size of constellation (M) and the number of bits (M) per frame coincidently use the same symbol M. For purposes of the present invention, the size of constellation M can be different from the number of bits M per frame.) Each frame of M bits is then parsed into N groups, where the k-th group is assigned m(k) bits, and M=m(0)+m(1)+ . . . +m(N−1).

Each group is separately mapped into a differential phase $\Delta\phi_f(k)$, where k=0, 1, . . . , N−1, according to a predetermined PSK constellation.

A differential phase encoder 12 operates on two consecutive frames, i.e., a current frame and a preceding frame, to generate an absolute phase $\phi_f(k)$ for each group in the current frame. Each absolute phase $\phi_f(k)$ is then used by a symbol (tone) encoder 13 for generating a complex symbol $X_f(k)$, or a discrete tone, on the complex signal plane. A complex symbol $X_f(k)$ equals $\overline{X}_f(k)\exp[j\phi_f(k)]$. The amplitude of $X_f(k)$ is chosen for maximizing the overall channel capacity or for achieving desired signal-to-noise ratios across the tones. Next, N complex symbols within each frame pass through a serial-to-parallel (S/P) converter 14 and are applied to an inverse discrete Fourier transform (IDFT) discrete multitone modulator 15. The N complex symbols within each frame are inverse discrete Fourier transformed into N complex samples in the time domain via an FFT.

The N parallel samples in each frame are converted to a serial sequence by a parallel-to-serial (P/S) converter 16, which also adds a cyclic prefix and suffix to each frame and further converts the enlarged complex sample sequence into two real data sequences by separating each complex sample into a real part and an imaginary part (RI). The length of the cyclic suffix is one or two samples, while the length of the cyclic prefix is the length of the cyclic suffix plus the unit-sample response of the overall digital channel including the transmitting and receiving filters as well as the transport medium between the transmitting and receiving filters. The one or two samples added for both prefix and suffix allow for a large timing offset in synchronization and sampling at the receiver, while the other samples appended to the prefix enable interframe-free interference, and thus intersymbol-free interference, over a time dispersive channel.

The two real sequences are then passed through two identical lowpass filters 17a and 17b for digital-to-analog (D/A) conversion. Two baseband signals are thus generated, and subsequently they modulate two quadrature carriers at mixers 18a and 18b. After quadrature multiplexing, appropriate power amplification and bandpass filtering at 19, successive (extended) frames are transmitted. The modem of FIG. 1 processes multiple bit streams that have each been associated with distinct tone sets in a similar fashion.

Figure 2:
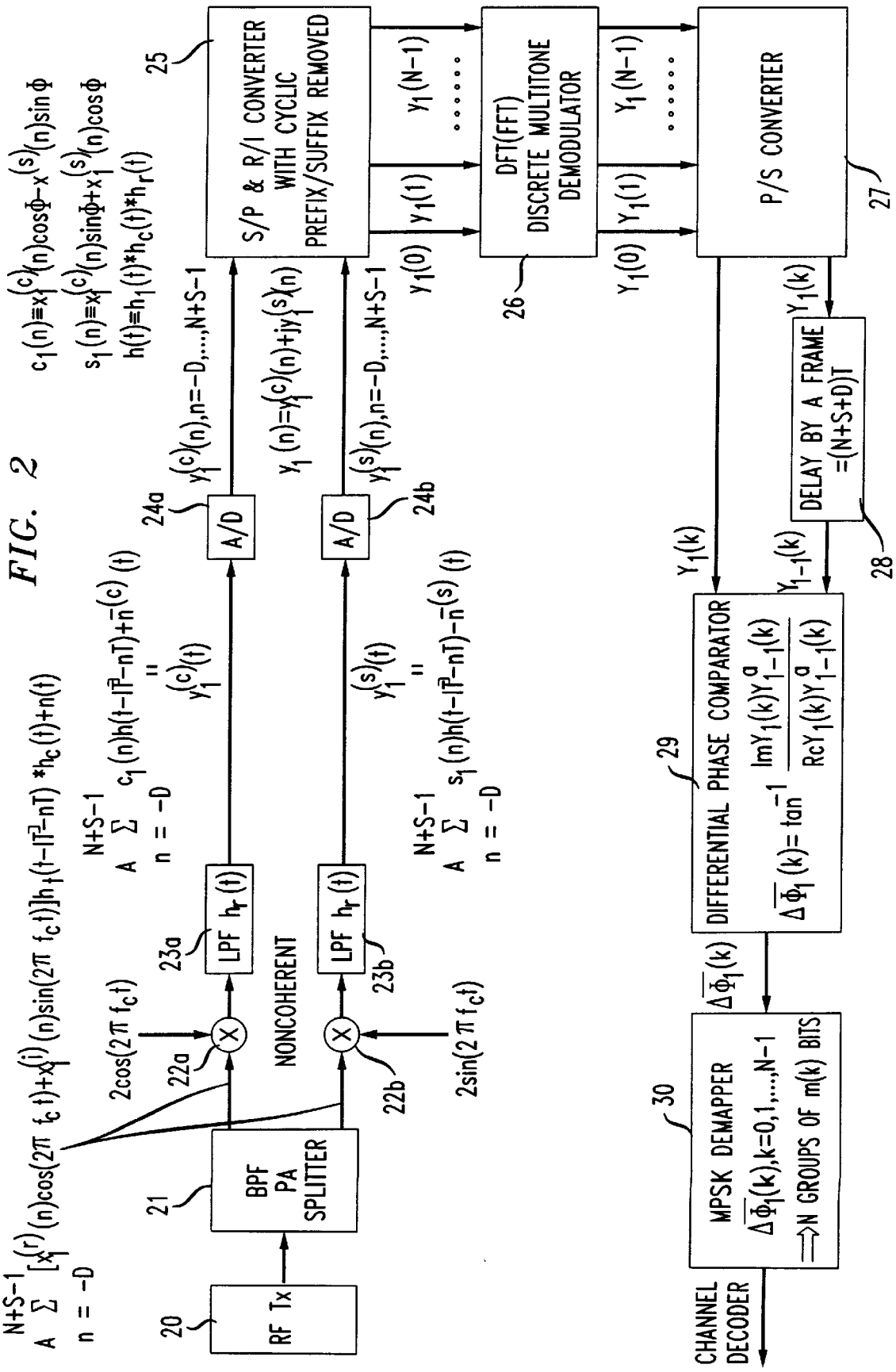
FIG. 2 shows a block diagram of the basic functional elements of an FFT-based multitone DPSK modem configured as a receiver according to the present invention.

FIG. 2 shows a block diagram of the basic functional elements of an FFT-based multitone DPSK modem configured as a receiver according to the present invention. A received RF signal 20 is bandpass filtered, power amplified, and split into two components at 21 for non-coherent quadrature demodulation (i.e., frequency down-conversion) at mixers 22a and 22b and lowpass filters 23a and 23b. The resulting quadrature baseband components are sampled in parallel by analog-to-digital (A/D) converters 24a and 24b. The output of A/D converters 24a and 24b are input to an S/P & R/I converter 25, where the two real sample sequences are converted to a complex sample sequence by treating each pair of the real samples as the real part and the imaginary part (R/I) of a complex sample. The samples at the two ends of the extended frame that are associated with the added prefix and suffix are discarded here, and the resulting N complex samples within each frame are further organized into a parallel format by a serial-to-parallel (S/P) converter.

The N parallel complex numbers within each frame are then discrete Fourier transformed via an FFT by discrete multitone demodulator 26 to yield N complex symbols. The N complex symbols are the transmitted tones weighted by the exponential of the difference of the locally generated and received carrier phases and by the frequency response of the overall channel at the corresponding tones, and further corrupted by noise. The N complex symbols pass through a parallel-to-serial (P/S) converter 27, having a serial output that is sent to a frame delay device 28 and a differential phase comparator 29. The output of frame delay device 28 is the input delayed by one frame. Differential phases between the corresponding symbols of two consecutive frames, i.e., the current frame and the preceding frame, are evaluated by differential phase comparator 29 in a well-known manner without having to determine the received carrier phase or the channel frequency response. The extracted differential phase values are mapped back to coded bits by an MPSK demapper 30 for subsequent channel decoding (not shown). Alternatively, the MPSK demapper and the channel decoder, such as a Viterbi decoder, may be combined for soft-decision decoding.

While the present invention has been described in connection with the illustrated embodiments, it will be appreciated and understood that modifications may be made without departing from the true spirit and scope of the invention.

What is claimed is:

1. A multitone modem comprising:

an MPSK mapper mapping a current frame of coded information bits into N differential phase signals, the current frame of bits being parsed into N groups of bits, each group of bits having a predetermined number of coded information bits;

a differential phase encoder generating absolute phase signals for the current frame based on the differential phase signals for the current frame and corresponding absolute phase signals of a frame preceding the current frame;

a symbol encoder generating N complex symbols for each frame based on the N absolute phase signals of the frame;

a discrete multitone modulator generating N complex, time-domain samples for each frame based on the N complex symbols of the frame, the N complex, time-domain samples having a real part and an imaginary part;

a real-imaginary part separator separating the complex samples in each frame into first and second data sequences for each frame, the first data sequence being a sequence of real samples that are the real part of the complex samples in each frame and the second data sequence being a sequence of real samples that are the imaginary part of the complex samples in each frame;

a digital-to-analog converter converting the first and second data sequences into first and second baseband signals, respectively;

a quadrature modulator forming in-phase and quadrature signal components by impressing the first and second baseband signals into quadrature carrier components; and a combiner combining the in-phase and quadrature signal components into an RF signal.

2. The multitone modem according to claim 1, further comprising a transmitter transmitting the RF signal.

3. The multitone modem according to claim 1, wherein the N complex symbols generated by the symbol encoder for each frame are a serial stream, the multitone modem further comprising a serial-to-parallel converter converting the serial steam of N complex symbols in each frame into a parallel stream of N complex symbols.

4. The multitone modem according to claim 1, wherein the discrete multitone modulator generates the N complex, time-domain samples for each frame by performing an inverse discrete Fourier transform on the N complex symbols of the frame.

5. The multitone modem according to claim 1, wherein the discrete multitone modulator generates the N complex, time-domain samples for each frame in parallel, the multitone modem further comprising a parallel-to-serial converter converting the parallel stream of N complex, time-domain samples in each frame into a serial stream of N complex, time-domain samples.

6. The multitone modem according to claim 1, wherein the real-imaginary separator augments the N complex samples of each frame with a cyclic prefix and a cyclic suffix, and separates the N complex samples augmented with the cyclic prefix and suffix into the first and second data sequences.

7. The multitone modem according to claim 6, wherein the cyclic prefix has a length that is equal to a length of the cyclic suffix plus a dispersion of a digital channel connected to the multitone modem.

8. The multitone modem according to claim 6, wherein a length of the cyclic suffix is one of one sample and two samples.

9. The multitone modem according to claim 1, wherein the digital-to-analog converter is a pair of lowpass filters.

10. The multitone modem according to claim 1, further comprising:

a non-coherent quadrature demodulator demodulating a received RF signal into first and second quadrature baseband signals, the received RF signal containing successive frames of coded information bits, each frame including N groups of coded information bits plus a prefix and a suffix, each group including a predetermined number of coded information bits;

first and second analog-to-digital converters respectively sampling the first and second quadrature baseband signals in parallel and generating first and second quadrature sample sequences;

a real-imaginary part combiner generating N complex numbers for each frame of coded information bits from the first and second quadrature sample sequences;

a discrete multitone demodulator generating N channel-weighted tone for each frame from the N complex numbers of the frame;

a differential phase comparator generating a stream of N phase difference signals for each frame based on a comparison of the N channel-weighted tones of a current frame and a frame preceding the current frame; and an MPSK demapper demapping the stream of N phase difference signals in each frame into coded information bits according to a predetermined phase constellation.

11. The multitone modem according to claim 10, wherein the real-imaginary part combiner removes the prefix and the suffix included with the first and second quadrature sample sequences in each frame, and generates the N complex numbers for each frame by pairing remaining corresponding samples of the first and second quadrature sample sequences in the frame.

12. The multitone modem according to claim 10, wherein the discrete multitone demodulator generates the N channel-weighted tones for each frame by performing a discrete Fourier transform on the N complex numbers of the frame.

13. The multitone modem according to claim 10, further comprising a frame delayer delaying the N channel-weighted tones of each frame by one frame.

14. A multitone modem comprising:
   a non-coherent quadrature demodulator demodulating a received RF signal into first and second quadrature baseband signals, the received RF signal containing successive frames of coded information bits, each frame including N groups of coded information bits, each group including a predetermined number of coded information bits;
   first and second analog-to-digital converters respectively sampling the first and second quadrature baseband signals in parallel and generating first and second quadrature sample sequences;
   a real-imaginary part combiner generating N complex numbers for each frame of coded information bits from the first and second quadrature sample sequences;
   a discrete multitone demodulator generating N channel-weighted tone for each frame from the N complex numbers of the frame;
   a differential phase comparator generating a stream of N phase difference signals for each frame based on a comparison of the N channel-weighted tones of a current frame and a frame preceding the current frame; and
   an MPSK demapper demapping the stream of N phase difference signals in each frame into coded information bits according to a predetermined phase constellation.

15. The multitone modem according to claim 14, wherein each frame includes N groups of coded information bits plus a prefix and a suffix.

16. The multitone modem according to claim 15, wherein the real-imaginary part combiner removes the prefix and the suffix included with the first and second quadrature sample sequences in each frame, and generates the N complex numbers for each frame by pairing remaining corresponding samples of the first and second quadrature sample sequences in the fame.

17. The multitone modem according to claim 14, wherein the discrete multitone demodulator generates the N channel-weighted tones for each frame by performing a discrete Fourier transform on the N complex numbers of the frame.

18. The multitone modem according to claim 10, further comprising a frame delayer delaying the N channel-weighted tones of each frame by one frame.

19. A method for transmitting coded information bits, comprising the steps of:
   mapping a current frame of coded information bits into N differential phase signals, the current frame of bits being parsed into N groups of bits, each group of bits having a predetermined number of coded information bits;
   generating absolute phase signals for the current frame based on the differential phase signals for the current frame and corresponding absolute phase signals of a frame preceding the current frame;
   generating N complex symbols for each frame based on the N absolute phase signals of the frame;
   generating N complex, time-domain samples for each frame based on the N complex symbols of the frame, the N complex, time-domain samples having a real part and an imaginary part;
   separating the complex samples in each frame into first and second data sequences for each frame, the first data sequence being a sequence of real samples that are the real part of the complex samples in each frame and the second data sequence being a sequence of real samples that are the imaginary part of the complex samples in each frame;
   converting the first and second data sequences into first and second baseband signals, respectively;
   forming in-phase and quadrature signal components by impressing the first and second baseband signals into quadrature carrier components; and
   combining the in-phase and quadrature signal components into an RF signal.

20. The method according to claim 19, further comprising the step of transmitting the RF signal.

21. The method according to claim 19, wherein the N complex symbols for each frame is a serial stream,
   the method further comprising the step of converting the serial stream of N complex symbols for each frame into a parallel stream of N complex symbols prior to the step of generating the N complex, time-domain samples.

22. The method according to claim 19, wherein the step of generating N complex, time-domain samples for each frame includes the step of performing an inverse discrete Fourier transform on the N complex symbols of the frame.

23. The method according to claim 19, wherein the N complex, timedomain samples of each frame are a parallel stream of N complex, time-domain samples,
   the method further comprising the step of converting the parallel stream of N complex, time-domain samples in each frame into a serial stream of N complex, time-domain samples.

24. The method according to claim 19, further comprising the steps of:
   augmenting the N complex samples of each frame with a cyclic prefix and a cyclic suffix; and
   separating the N complex samples augmented with the cyclic prefix and cyclic suffix samples into first and second data sequences.

25. The method according to claim 24, wherein the cyclic prefix has a length that is equal to a length of the cyclic suffix plus a dispersion of a digital channel over which the coded information bits are sent.

26. The method according to claim 24, wherein a length of the cyclic suffix is one of one sample and two samples.

27. The method according to claim 19, wherein the step of converting the first and second data sequences into the first and second baseband signals, respectively, is done by identical first and second digital-to-analog converters.

28. The method according to claim 19, further comprising:
   non-coherently quadrature demodulating a received RF signal into first and second quadrature baseband signals, the received RF signal containing successive frames of coded information bits, each frame including N groups of coded information bits plus a prefix and a suffix, each group including a predetermined numbered coded information bits;
   generating first and second quadrature sample sequences by sampling the first and second quadrature baseband signals in parallel;
   generating N complex numbers for each frame of coded information bits from the first and second quadrature sample sequences;
   generating N channel-weighted tones for each frame from the N complex numbers of the frame;

generating a stream of N phase difference signals for each frame based on a comparison of the N channel-weighted tones of a current frame and a frame preceding the current frame; and demapping the stream of N phase difference signals in each frame into the coded information bits according to a predetermined phase constellation.

29. The method according to claim 28, further comprising the steps of:

removing the prefix and the suffix included with the first and second quadrature sample sequences in each frame; and generating the N complex numbers for each frame by pairing remaining corresponding samples of the first and second quadrature sample sequences in the frame.

30. The method according to claim 28, wherein the step of generating N channel-weighted tones for each frame is done by performing a discrete Fourier transform on the N complex numbers of the frame.

31. The method according to claim 28, further comprising the step of delaying the N channel-weighted tones of each frame by one frame.

32. A method of receiving coded information bits, comprising the steps of:

non-coherent quadrature demodulating a received RF signal into first and second quadrature baseband signals, the received RF signal containing successive frames of coded information bits, each frame including N groups of coded information bits, each group including a predetermined number of coded information bits;

generating first and second quadrature sample sequences by sampling the first and second quadrature baseband signals in parallel;

generating N complex numbers for each frame of coded information bits from the first and second quadrature sample sequences;

generating N channel-weighted tone for each frame from the N complex numbers of the frame;

generating a stream of N phase difference signals for each frame based on a comparison of the N channel-weighted tones of a current frame and a frame preceding the current frame; and demapping the stream of N phase difference signals in each frame into coded information bits according to a predetermined phase constellation.

33. The method according to claim 32, wherein each frame includes N groups of coded information bits plus a prefix and a suffix.

34. The method according to claim 33, further comprising the steps of:

removing the prefix and the suffix included with the first and second quadrature sample sequences in each frame; and generating the N complex numbers for each frame by pairing remaining corresponding samples of the first and second quadrature sample sequences in the frame.

35. The method according to claim 32, wherein the step of generating N channel-weighted tones for each frame is done by performing a discrete Fourier transform on the N complex numbers of the frame.

36. The method according to claim 32, further comprising the step of delaying the N channel-weighted tones of each frame by one frame.

* * * * *